Nov. 15, 1949 — J. A. MORRONE — 2,488,425
COMBINED HAND TRUCK AND HOSE REEL
Filed April 19, 1946 — 2 Sheets-Sheet 1
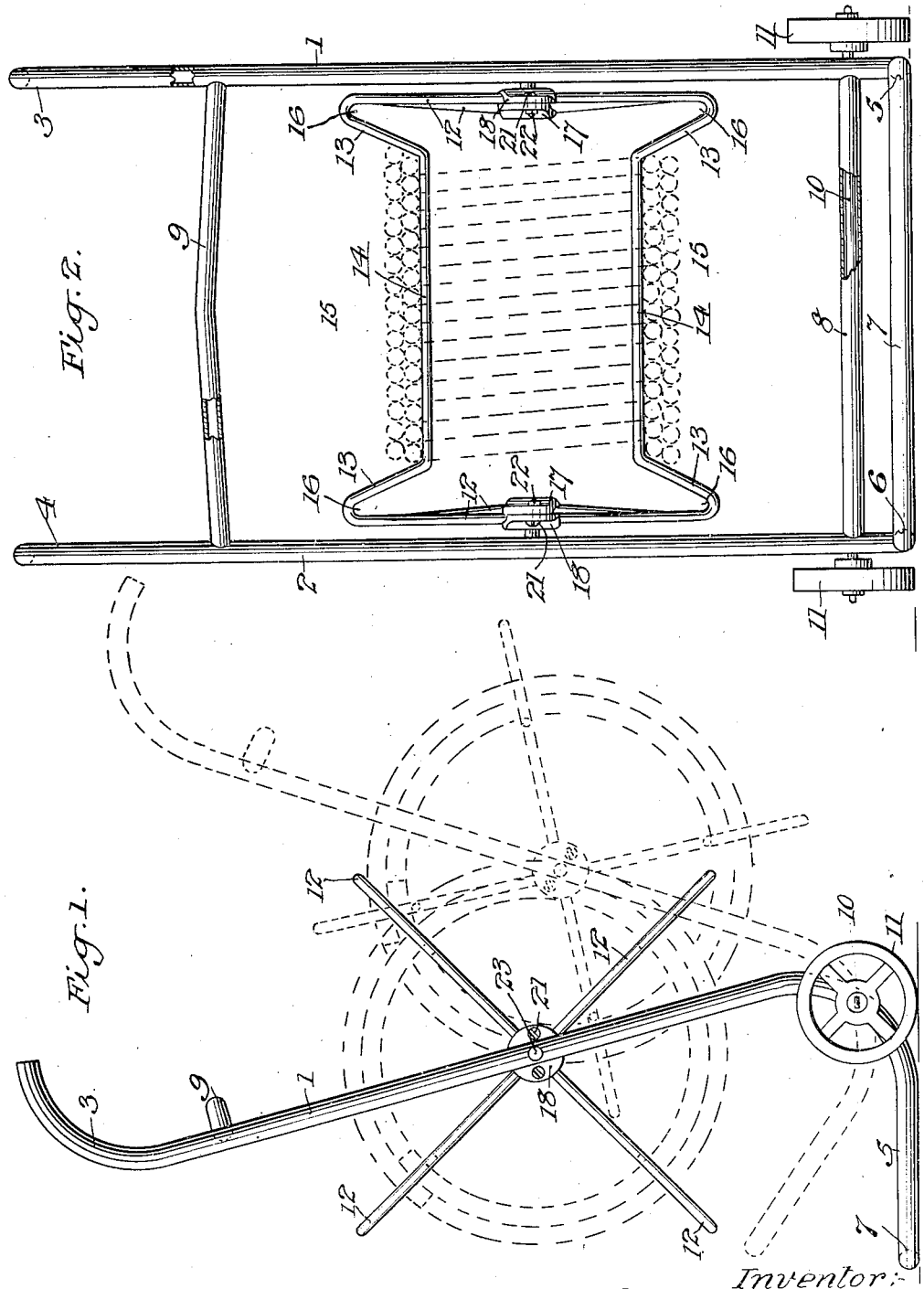
Inventor:
Joseph A. Morrone
by
Attorneys

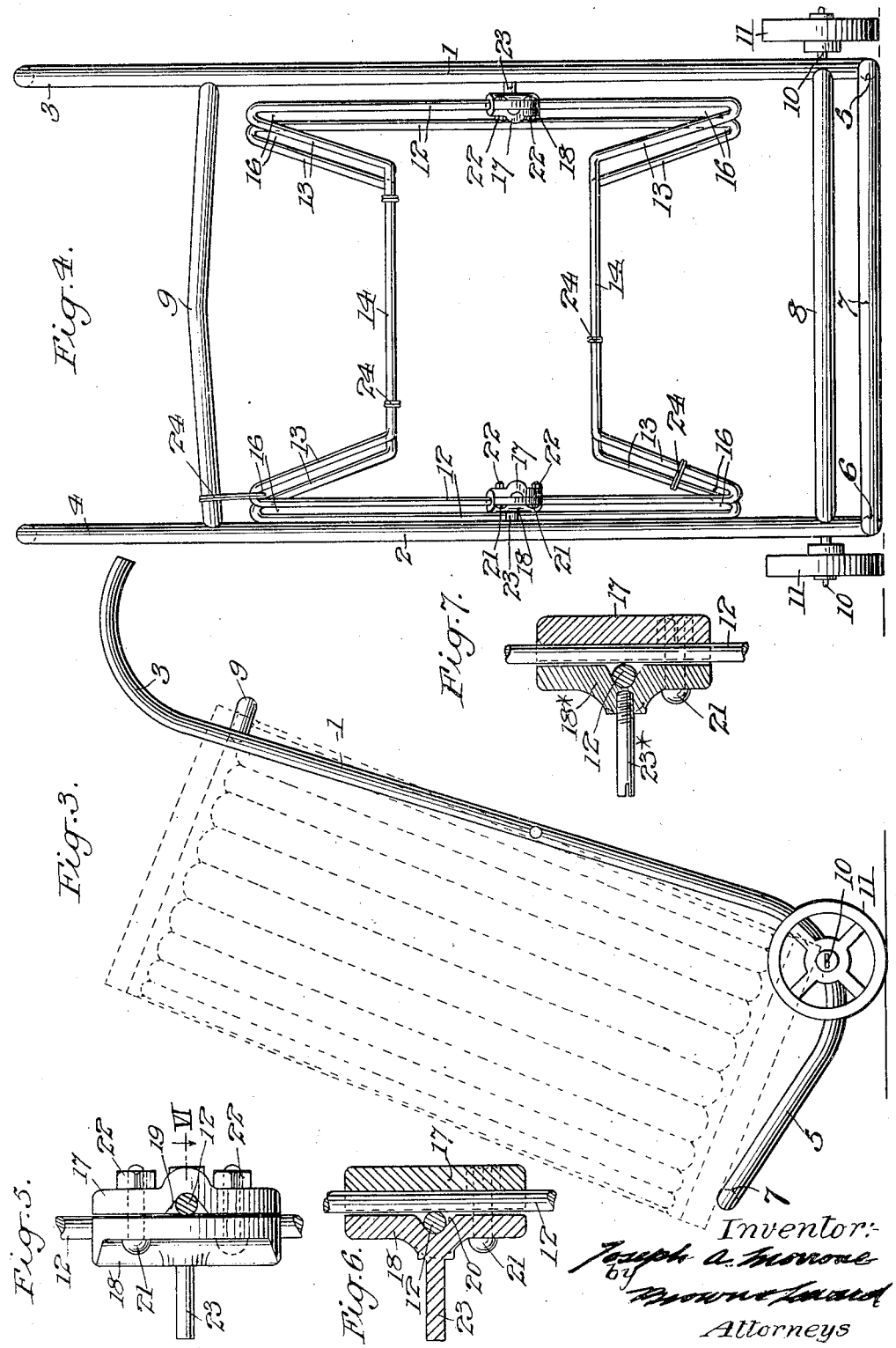

Patented Nov. 15, 1949

2,488,425

UNITED STATES PATENT OFFICE 2,488,425

COMBINED HAND TRUCK AND HOSE REEL

Joseph A. Morrone, Westerly, R. I.

Application April 19, 1946, Serial No. 663,561

2 Claims. (Cl. 242—87)

My invention comprises, generally, a combined hand truck and hose reel in which the truck serves both as a support and a wheeled carrier for the hose reel, and, when the hose reel is removed, serves as a wheeled carrier for various types and kinds of receptacles, as, for instance, coal, oil, ash and refuse containers.

My invention comprises, more particularly, a combined truck and hose reel in which the reel is rotatably and removably mounted in the truck frame and in which the reel may be knocked down and packed with the truck in a small space for shipment or storage.

My invention also comprises novel features of construction in the truck and reel whereby they may be made light, strong and inexpensive to manufacture and whereby, if desired, the reel may be readily removed from the truck without knocking down the reel.

Practical embodiments of my invention are represented in the accompanying drawings, in which Fig. 1 represents in full lines a side view of the combined truck and reel in its position at rest and in dotted lines in a position suitable for use in wheeling the hose reel from place to place;

Fig. 2 represents a front view of the combined truck and reel with certain of the parts broken away;

Fig. 3 represents a side view of the truck with the reel removed and a receptacle, shown in a dotted position carried by the truck;

Fig. 4 represents a front view showing the reel knocked down and attached to the truck for shipment or storage;

Fig. 5 represents an enlarged detail view of one of the hose reel clamps with the crossed end portions of the reel winding members locked therein;

Fig. 6 represents a detail section taken in the plane of the line VI of Fig. 5, looking in the direction of the arrow; and Fig. 7 represents a similar section showing a removable pivot pin attached to the outer member of the clamp.

The hand truck frame is shown as comprising tubing of the required size bent to form uprising side portions 1 and 2 developed at their upper ends into hand portions 3 and 4 and at their lower ends into lateral side foot portions 5 and 6 connected by a cross foot portion 7.

A straight lower tubular brace 8 is shown as extending across and forming an integral part of the frame at the curved junctions of the lateral foot portions 5 and 6 with their uprising side portions 1 and 2.

An upper tubular brace 9 is shown as extending across and forming an integral part of the frame between the uprising side portions 1 and 2 at the desired height above the lower cross brace 8. This upper tubular cross brace 9 is preferably slightly bent laterally of the frame out of a right line to more positively position transversely curved receptacles on the truck when the hose reel has been removed therefrom.

A crossbar 10 is shown as passing through the lower cross brace 8 and as having suitable traction wheels 11 mounted at its ends exterior to the frame. In practice, the traction wheels may be rotatably mounted on the ends of the crossbar 10 and the crossbar 10 may be rotatably mounted in the lower cross brace 8.

The hose reel which is rotatably and removably mounted in the truck frame is shown as comprising two hose winding members disposed at right angles to each other and locked by pivot clamps.

Each hose winding member comprises a rod preferably of resilient material, bent to form two radial end portions 12, four diagonal inwardly directed portions 13 and two transverse portions 14. This arrangement provides two hose receiving recesses 15 and four tapered open loops 16 for each hose winding member.

Two clamps are provided for locking the two hose winding members together at right angles to each other and for removably pivoting the hose reel to the uprising side members of the hand truck frame. Each of these clamps is shown as comprising inner and outer members 17 and 18 having crossed grooves 19 and 20 respectively for receiving in different planes two adjacent crossed end portions 13, 13 of the hose winding members. Bolts 21 passing through the clamp members are provided with nuts 22 for drawing the clamp members together to removably lock the crossed end portions 13, 13 therebetween.

In Figs. 5 and 6 the outer members 18 of these clamps are provided with integral pivot pins 23 projecting outwardly therefrom, which pivot pins are removably journaled in their adjacent uprising side portions 1 and 2 of the truck frame between the lower and upper cross braces 8 and 9. In Fig. 7 one of the pivot pins, denoted in this embodiment by 23*, is shown as screwed into its outer clamp member 18* instead of integral therewith as in Figs. 5 and 6.

In practice, if the truck is to be used with the reel and it be desired to support the reel in a fixed position the truck frame is swung forwardly around the axis of the traction wheels 11 until the cross foot portion 7 of the frame rests on the ground or other surface. If it be desired to move the reel to different places the truck frame may be swung back sufficiently to raise the cross foot portion 7 thereby supporting the frame on the said traction wheels.

If the truck is to be used as a carrier for transporting a receptacle from place to place the hose reel may be removed from the truck frame either by releasing the hose winding members from their clamps, or by springing the crossed end portions with the clamps locked thereto inwardly a sufficient distance to withdraw the pivot pins from their engagement with the uprising side portions of the truck frame.

If it be desired to ship or store the combined truck and reel the clamps may be released sufficiently to permit one of the hose winding members to be removed therefrom and secured by any suitable means, as wires 24, to the other winding member, and the two winding members to the truck frame between and in substantial alinement with the uprising side portions of the frame.

It is evident that various changes may be resorted to in the construction, form and arrangement of the several parts without departing from the spirit and scope of my invention, and hence I do not intend to be limited to the particular embodiments herein shown and described, but what I claim is:

1. In combination, a hand truck arranged to transport receptacles and comprising a truck frame consisting of tubing bent to form a cross foot portion acting as a fixed support for the truck, side foot portions extending rearwardly from the cross foot portion and uprising side portions developed into hand portions, traction wheels mounted on the truck frame to form a movable support for the truck, and a knockdown hose reel comprising separable hose winding members having crossed radial end portions, clamps having inner and outer separable members removably locking said end portions together at their crossings, and pins projecting from said outer clamp members rotatably and removably journaled in said uprising side portions of the truck frame.

2. In combination, a hand truck arranged to transport receptacles and comprising a truck frame consisting of tubing bent to form a cross foot portion acting as a fixed support for the truck, side foot portions extending rearwardly from the cross foot portion and uprising side portions developed into hand portions, traction wheels mounted on the truck frame to form a movable support for the truck, and a knockdown hose reel comprising separable hose winding members having crossed radial end portions, clamps having inner and outer separable members removably locking said end portions together at their crossings, and pins projecting from said outer clamp members rotatably and removably journaled in said uprising side portions of the truck frame the said radial end portions being resilient to allow them to be sprung inwardly to withdraw the pins from their engagement with the said uprising side portions.

JOSEPH A. MORRONE.

REFERENCES CITED

The following references are of record in the file of this patent:

UNITED STATES PATENTS

| Number | Name | Date |
|--------|------|------|
| 201,388 | Castle | Mar. 19, 1878 |
| 459,669 | Abbott | Sept. 15, 1891 |
| 698,346 | Wood | Apr. 22, 1902 |
| 957,427 | Lafont | May 10, 1910 |
| 987,411 | Spencer | Mar. 21, 1911 |
| 1,033,906 | Kennedy | July 30, 1912 |
| 1,643,993 | Parker | Oct. 4, 1927 |
| 1,679,325 | Black | July 31, 1928 |
| 1,985,362 | Clyde | Dec. 25, 1934 |